United States Patent
Aiba

(10) Patent No.: US 7,552,432 B2
(45) Date of Patent: Jun. 23, 2009

(54) INFORMATION PROCESSING APPARATUS, INFORMATION PROCESSING METHOD, AND CONTROL PROGRAM

(75) Inventor: Tsukasa Aiba, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 520 days.

(21) Appl. No.: 10/889,632

(22) Filed: Jul. 12, 2004

(65) Prior Publication Data
US 2005/0028173 A1 Feb. 3, 2005

(30) Foreign Application Priority Data
Jul. 31, 2003 (JP) ............... 2003-205052

(51) Int. Cl.
G06F 9/445 (2006.01)
G06F 15/177 (2006.01)
G06F 3/12 (2006.01)

(52) U.S. Cl. ............ 717/177; 717/172; 709/221; 719/327

(58) Field of Classification Search .......... 717/174–178
See application file for complete search history.

(56) References Cited

U.S. PATENT DOCUMENTS

| | | | | |
|---|---|---|---|---|
| 5,860,012 | A * | 1/1999 | Luu ........................... | 717/175 |
| 6,023,585 | A * | 2/2000 | Perlman et al. ............. | 717/178 |
| 6,205,527 | B1 * | 3/2001 | Goshey et al. ............. | 711/162 |
| 6,789,111 | B1 * | 9/2004 | Brockway et al. .......... | 709/222 |
| 6,966,058 | B2 * | 11/2005 | Earl et al. ................... | 717/171 |
| 7,103,650 | B1 * | 9/2006 | Vetrivelkumaran et al. .. | 709/221 |
| 7,107,588 | B2 * | 9/2006 | Gentry ........................ | 717/176 |
| 7,150,025 | B2 * | 12/2006 | Gentry et al. ............... | 719/327 |
| 7,219,344 | B2 * | 5/2007 | Chenelle et al. ............ | 717/177 |
| 2002/0083431 | A1 * | 6/2002 | Machida ..................... | 717/174 |
| 2002/0147966 | A1 * | 10/2002 | Frazier ...................... | 717/127 |
| 2003/0046674 | A1 * | 3/2003 | Gentry et al. ............... | 717/171 |
| 2003/0051011 | A1 * | 3/2003 | Schacht et al. ............. | 709/221 |
| 2003/0217170 | A1 * | 11/2003 | Nelson et al. .............. | 709/231 |

(Continued)

FOREIGN PATENT DOCUMENTS

JP 2003-140852 A 5/2003

(Continued)

OTHER PUBLICATIONS

Paul Sheer, "LINUX: Rute User's Tutorial and Exposition", Aug. 14, 2001, p. 1-330.*

(Continued)

Primary Examiner—Tuan Q Dam
Assistant Examiner—Marina Lee
(74) Attorney, Agent, or Firm—Canon U.S.A. Inc., I.P. Division

(57) ABSTRACT

A push installation system including a server and clients connected via a network, the server installing a device driver on one or more clients via the network, is provided. The server includes an acquisition unit for acquiring, via the network, an operating state of each of the clients connected to the network; a determination unit for determining whether or not each of the clients is in a ready-for-installation state, in which installation can be performed, based on the operating state of each of the clients acquired by the acquisition unit; and an installation unit for performing processing, via the network, for installing or updating the device driver on at least one client that is determined to be in the ready-for-installation state.

24 Claims, 7 Drawing Sheets

U.S. PATENT DOCUMENTS

2004/0015956 A1* 1/2004 Barfield et al. ............... 717/174
2004/0030809 A1* 2/2004 Lozano et al. ................. 710/8
2004/0268050 A1* 12/2004 Cai et al. .................... 711/137

OTHER PUBLICATIONS

"Advancd Concepts Guide: Citrix MetalFrame XP for Windows with Feature Release 3", Citrix System, Inc., 2002. p. 1-380.*

* cited by examiner

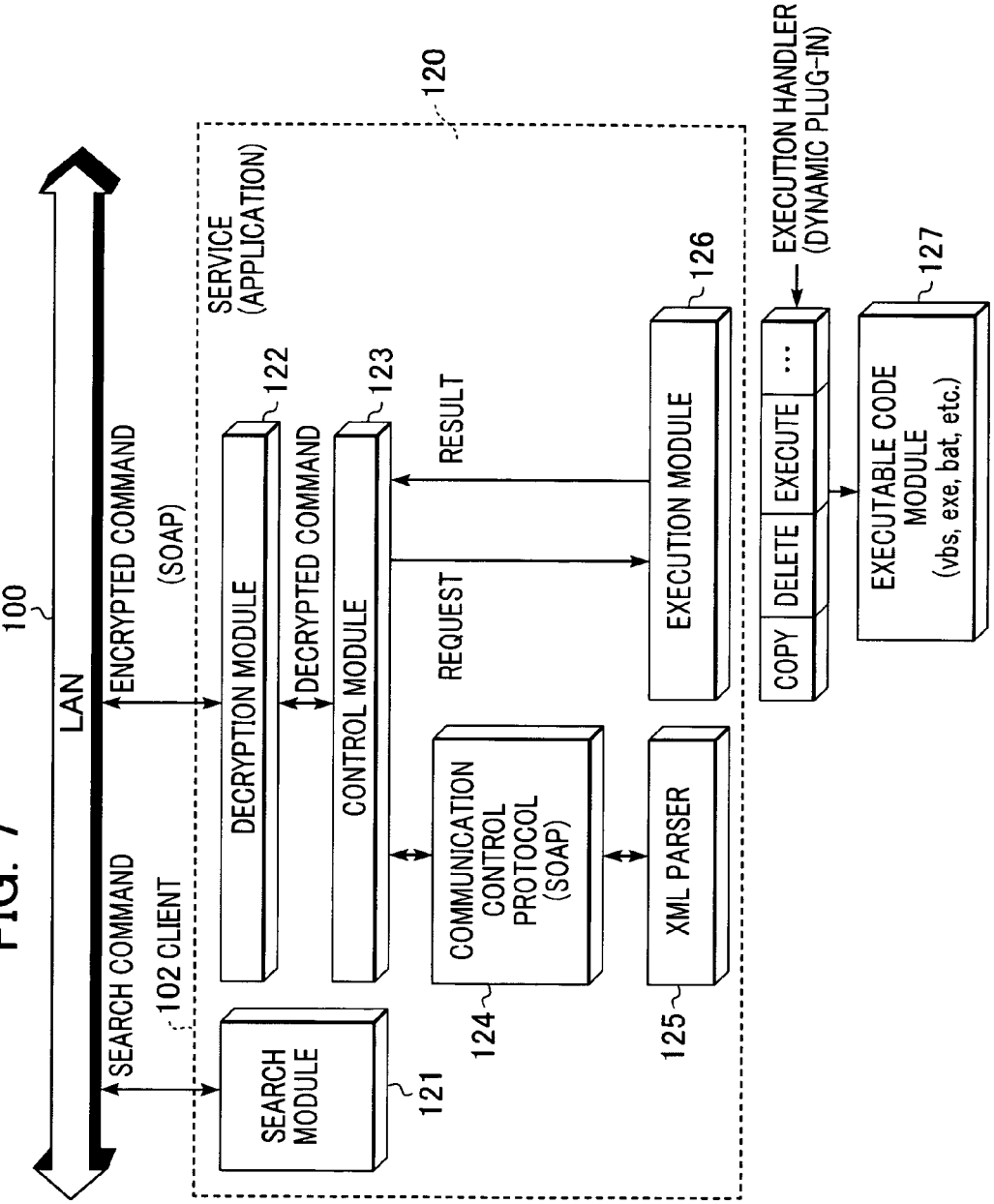

US 7,552,432 B2

INFORMATION PROCESSING APPARATUS, INFORMATION PROCESSING METHOD, AND CONTROL PROGRAM

This application claims priority from Japanese Patent application No. 2003-205052 filed Jul. 31, 2003, which is incorporated hereby by reference.

BACKGROUND OF THE INVENTION

1. Field of the Invention

The present invention relates to installing a device driver on one or more clients from a server via a network.

2. Description of the Related Art

In order to install printer drivers using operating system (OS) dependent systems, for example, using Windows®, users select "add printer" on a "properties" page for printers and then input necessary information through a dialog called a wizard. Also, in order to minimize the number of user operations, in addition to applications, printer drivers are installed using installers.

When the installation methods described above are used in large companies having many users, that is, having many clients, printer drivers must be installed on many clients. Thus, the total number of man-hours required for installing the printer drivers on all of the clients is not negligible from an economic point of view. Also, such clients need to have a performance higher than a predetermined level for installation of printer drivers. Thus, detailed manuals for such operations must be prepared and training must be provided for all the clients. In the worst case, network administrators must perform a large number of tasks, such as installing a printer driver on each of the clients. In other words, in accordance with an increase in the number of clients, operational man-hours are increased proportionally.

Also, in companies having many computers, many days may be needed for properly installing drivers on the many computers.

Point and print installation using a printer server is used in order to reduce as much as possible such operational man-hours required for installing printer drivers. In this installation method, a mechanism provided in Windows NT® or Windows 2000® for automatically distributing a printer driver to a client is used.

However, although such a point and print method using a printer server is capable of installing a printer driver on all of the clients by automatically distributing the printer driver, installation of the printer driver starts irrespective of the state of the clients. Thus, if, for example, a printer driver is updated when a client is performing printing, the printing is suspended or the printer driver cannot be updated.

SUMMARY OF THE INVENTION

An aspect of the present invention is to provide a push installation system capable of installing or updating a device driver on a client without interfering with the client.

A push installation system including an information processing apparatus and clients connected via a network is disclosed. The information processing apparatus installs or updates a device driver on one or more clients via the network. The information processing apparatus includes an acquisition unit for acquiring, via the network, an operating state of each of the clients connected to the network; a determination unit for determining whether or not each of the clients is in a ready-for-installation state based on the operating state of each of the clients acquired by the acquisition unit; and an installation unit for performing processing, via the network, for installing or updating the device driver on at least one client that is determined to be in the ready-for-installation state. The client includes a search module for receiving an operating state request from the in formation processing apparatus, determining the operating state of the client and transmitting the operating state of the client to the information processing apparatus; and an execution module for installing or updating the device driver received from the information processing apparatus via the network.

Other features and advantageous of the present invention will be apparent from the following description taken in conjunction with the accompanying drawings, in which like reference characters designate the same or similar parts throughout.

BRIEF DESCRIPTION OF THE DRAWINGS

FIG. 7 is a block diagram showing the structure of one of the clients for receiving the printer driver.

DESCRIPTION OF THE PREFERRED EMBODIMENTS

Embodiments of the present invention are described below with reference to the drawings.

Figure 1:
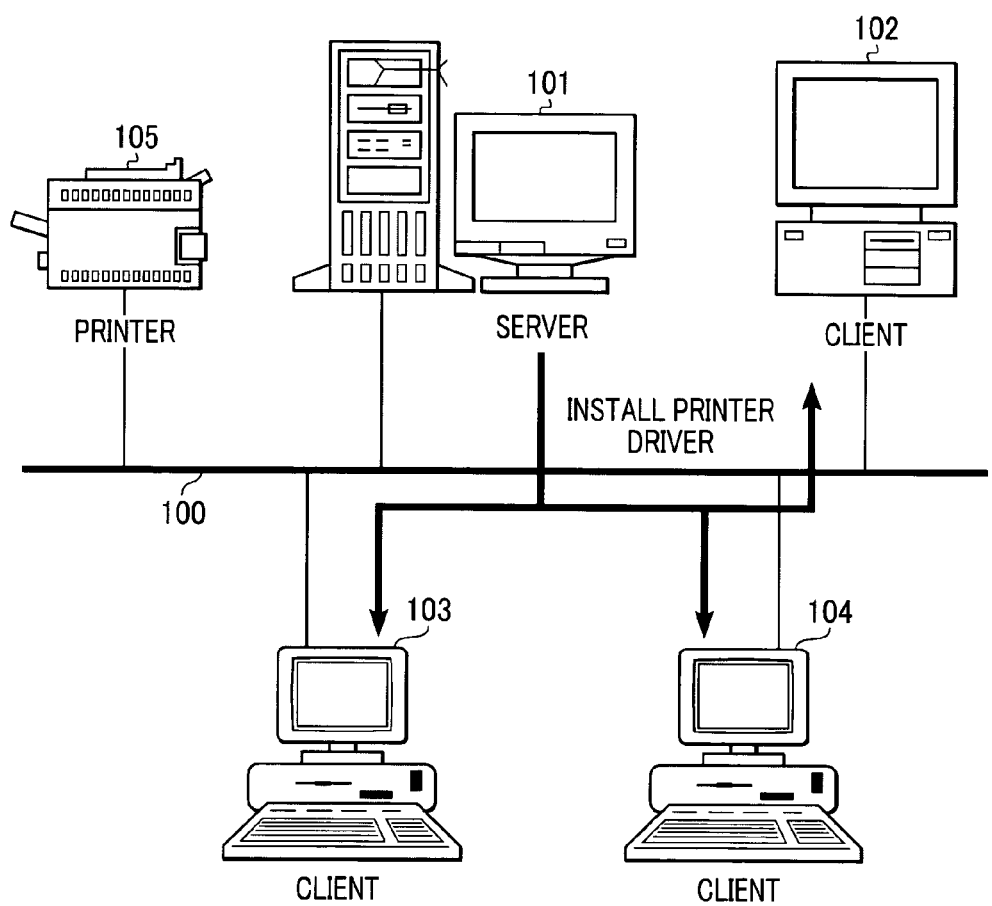
FIG. 1 is a block diagram showing the structure of a network system in which a push installation system according to an embodiment of the present invention is installed.

FIG. 1 is a block diagram showing the structure of a network system in which a push installation system according to an embodiment of the present invention is installed.

In the network system, a server 101, a plurality of clients 102, 103, and 104, and a printer 105 are connected to each other via a local area network (LAN) 100. A so-called push installation system in which the server 101 installs a printer driver on the clients 102, 103, and 104 via the LAN 100 is installed in the network system. The push installation system is described below. In addition to the apparatuses described above, other clients, other printers, a scanner, a digital camera, a facsimile machine, a mouse, a speaker, a sound source, a telephone set, a copying machine, or some combination thereof (none of which are shown) may be connected to the LAN 100.

Figure 2:
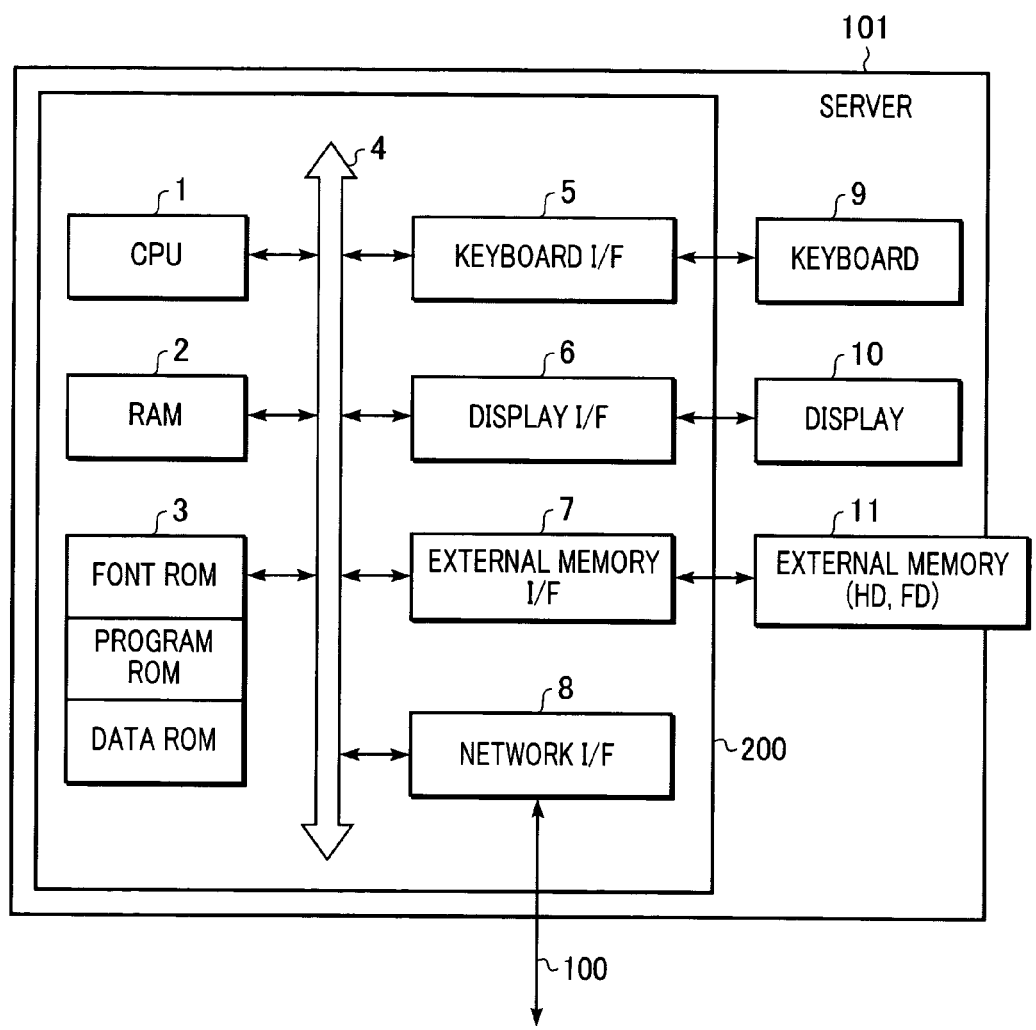
FIG. 2 is a block diagram showing the structure of a server shown in FIG. 1.

The structure of the server 101 is described next with reference to FIG. 2. FIG. 2 is a block diagram showing the structure of the server 101 shown in FIG. 1.

The server 101 includes a main unit 200. The main unit 200 includes a central processing unit (CPU) 1 for launching an operating system (OS) stored in a program read-only memory (ROM) of a ROM 3 or in an external memory 11 and for performing various types of processing on the OS. The CPU 1 generally controls devices connected to a system bus 4.

For example, the CPU 1 performs document processing, in accordance with a document processing program stored in the program ROM of the ROM 3 or the external memory 11, for drawings, images, characters, and tables (including spreadsheets) mixed together. The CPU 1 uses a random-access memory (RAM) 2 as a work area for performing various types of processing.

The ROM 3 includes a font ROM and a data ROM, in addition to the program ROM. The font ROM stores font data used for the document processing or the like. Also, similar font data may be stored in the external memory 11. The data ROM stores data used for the document processing or the like.

Devices connected to the system bus 4 include a keyboard interface (I/F) 5, a display I/F 6, an external memory I/F 7, and a network I/F 8.

The keyboard I/F 5 controls input from a keyboard 9 and a pointing device, such as a mouse (not shown). The display I/F 6 controls display of a display 10, such as a liquid crystal display (LCD) or a cathode ray tube (CRT). The external memory I/F 7 controls access to the external memory 11.

The external memory 11 includes a hard disk (HD), a floppy disk (FD), and the like for storing various application programs, font data, a user file, an editing file, a printer driver, and the like.

The network I/F 8 is connected to the LAN 100 and performs communication control processing between the printer 105 and the clients 102, 103, and 104.

For example, the CPU 1 performs rasterization of an outline font in RAM for display information provided in the RAM 2 so as to enable WYSIWYG (what you see is what you get) on the display 10. Also, the CPU 1 opens various windows registered in accordance with commands designated by a mouse (not shown) or the like on the display 10 to perform various types of data processing.

Each of the clients 102, 103, and 104 has a structure similar to that of the server 101 described above. Therefore, the structure of the clients 102, 103, and 104 is not described herein.

Figure 3:
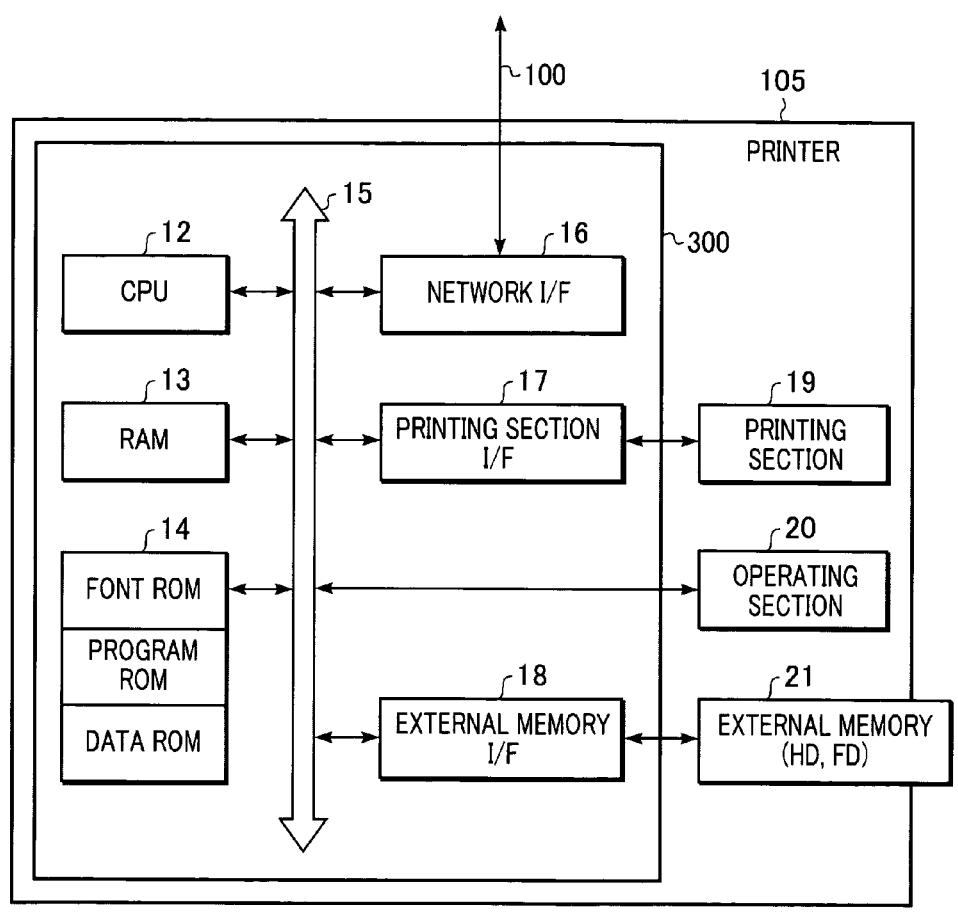
FIG. 3 is a block diagram showing the structure of a printer shown in FIG. 1.

The structure of the printer 105 is described next with reference to FIG. 3. FIG. 3 is a block diagram showing the structure of the printer 105.

The printer 105 includes a controller 300 for controlling operations of the printer 105. The controller 300 includes a network I/F 16 connected to the LAN 100. The network I/F 16 captures, via the LAN 100, printing information, such as characters, drawings, and images, output from the clients 102, 103, and 104 in a printer language format. The captured printing information is supplied to a CPU 12 via a system bus 15.

The CPU 12 expands the printing information output from the clients 102, 103, and 104 in a work area of a RAM 13 in accordance with a control program stored in a program ROM of a ROM 14 or in an external memory 21. The CPU sends image data for each page as a picture signal to a printing section (printer engine) 19 via the system bus 15 and a printing section I/F 17, and controls the printing section 19 to record the picture signal for each page on recording paper.

The ROM 14 includes a font ROM and a data ROM, in addition to the program ROM. The font ROM stores font data used for generating the picture signal. The data ROM stores data used in the clients 102, 103, and 104. Also, this data may be stored in the external memory 21.

The RAM 13 is used for storing results of calculation and processing and is used as a buffering area for input data, an expansion area of drawing information for both sides of recording paper, an environment data storage area, a non-volatile RAM (NVRAM), and the like. An optional RAM connected to an expanded port (not shown) may be provided, in addition to the RAM 13, so as to expand the memory capacity.

The external memory 21 includes storage means, such as a hard disk (HD) and a floppy disk (FD). Access to the external memory 21 is controlled by an external memory I/F 18. Also, the external memory 21 may include other storage media, such as a memory card. The number of external memories is not necessarily limited to one. A plurality of external memories that store programs for understanding printer control languages of different language systems and option fonts, in addition to stored fonts, may be connected. Furthermore, an NVRAM may be provided in order to store printer mode setting information sent from an operating section 20.

The operating section 20 sends instructions to the CPU 12. The operating section 20 includes keys used for setting various modes, an LED (light emitting diode) indicator, and the like.

Figure 4:
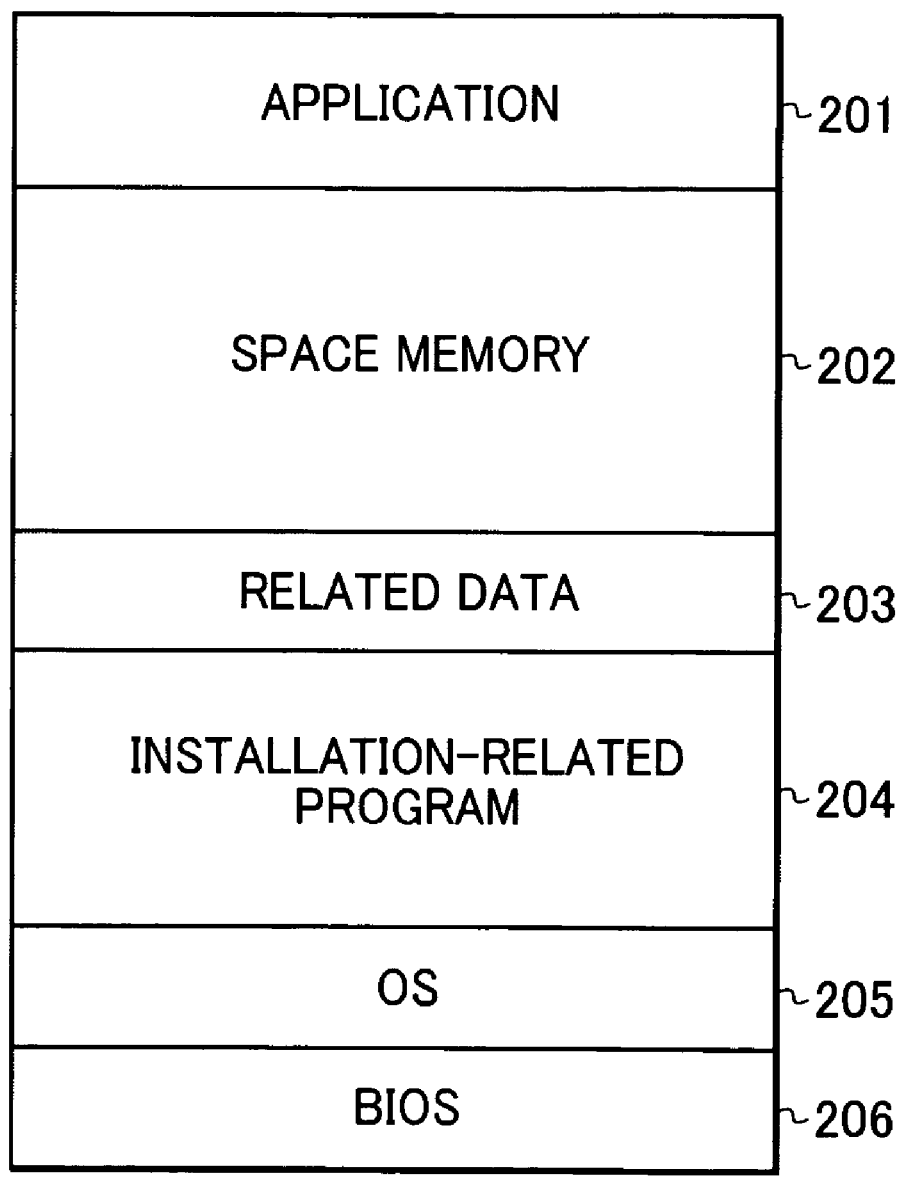
FIG. 4 shows a memory map of a random access memory (RAM) on the server.
Figure 5:
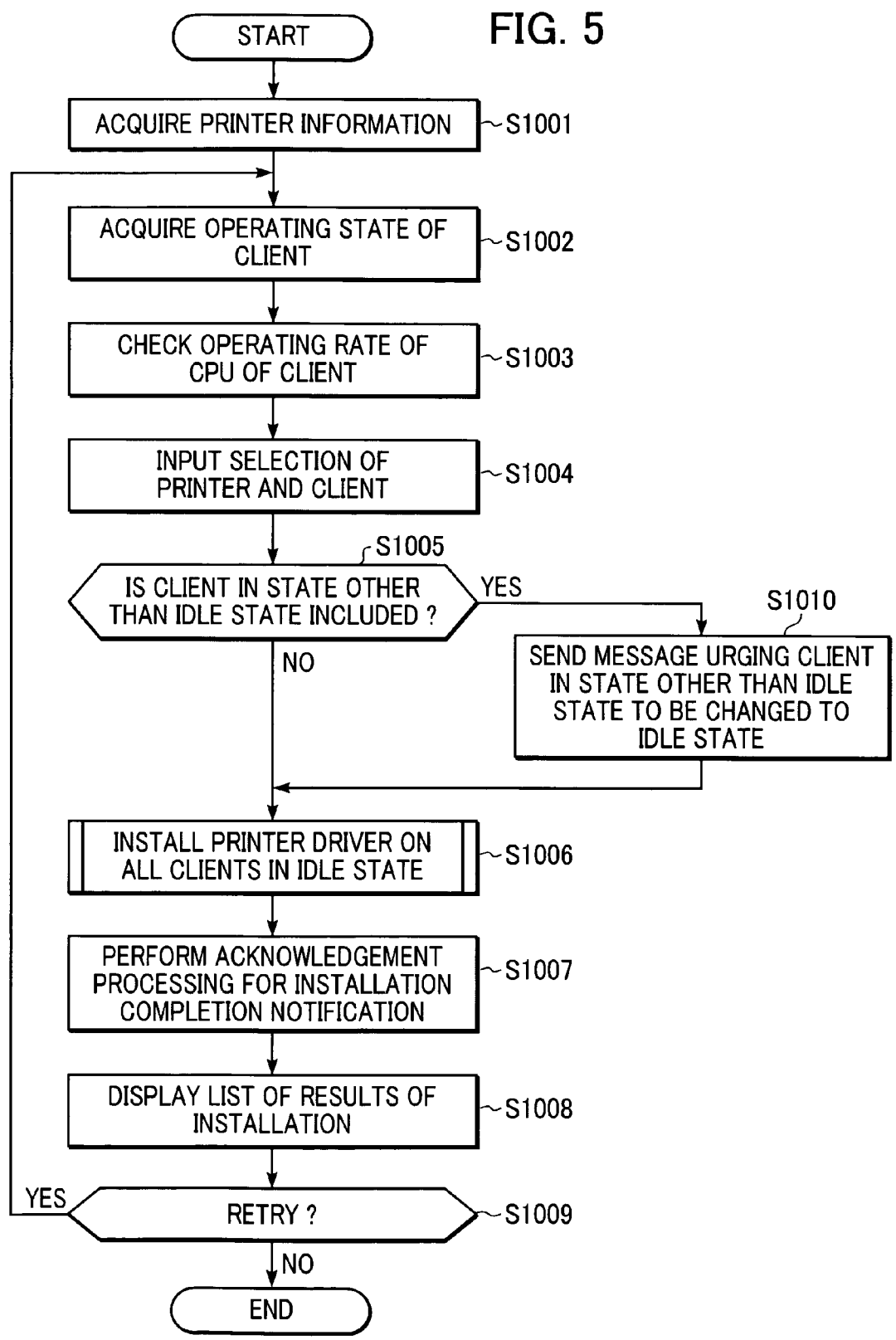
FIG. 5 is a flowchart of a process performed by the server for push-installing a printer driver.
Figure 6:
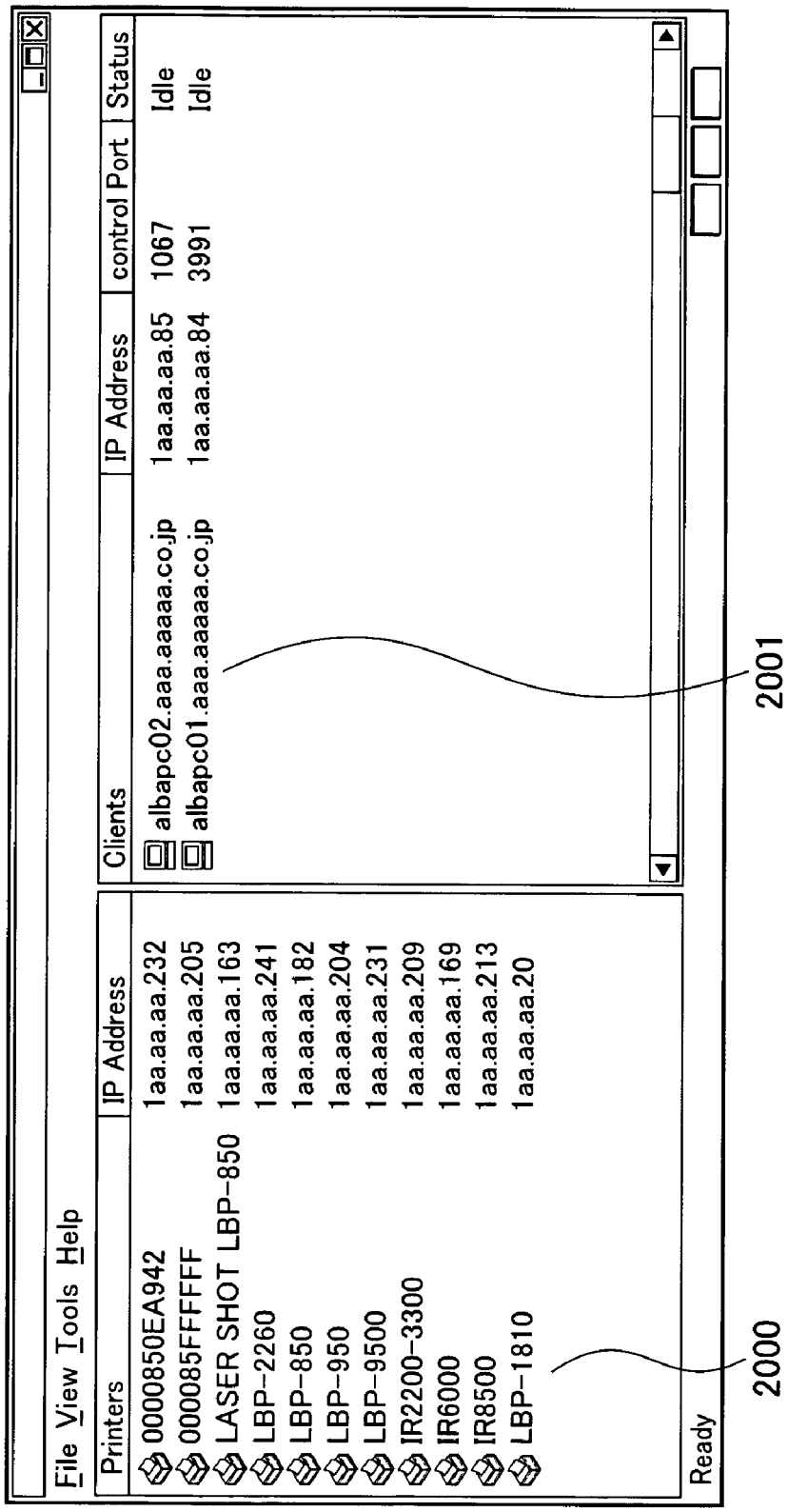
FIG. 6 shows an example of a screen for printers and clients displayed on the server after performing searching.

In this embodiment, push installation in which the server 101 installs a printer driver on one or more clients via the LAN 100 is performed. Such push installation of the printer driver is described next with reference to FIGS. 4 to 7. FIG. 4 shows a memory map of the RAM 2 on the server 101. FIG. 5 is a flowchart of a process performed by the server 101 for push-installing the printer driver. FIG. 6 shows an example of a screen displayed on the server 101 listing printers and clients as determined based on a search. FIG. 7 is a block diagram showing the structure of the client 102 for receiving the printer driver.

Referring to FIG. 4, in the server 101, an installation-related program 204 is loaded into the RAM 2, so that the printer driver can be push-installed. The installation-related program 204 includes an installation control program for realizing push installation of the printer driver. In FIG. 4, a state in which an application 201, related data 203, an operating system (OS) 205, and a basic input/output system (BIOS) 206, in addition to the installation-related program 204, are loaded in the RAM 2 is shown. A space area in the RAM 2 is represented by a space memory 202.

The installation control program includes an acquisition module for acquiring an operating state of each of a plurality of clients via the LAN 100, a designation module for designating a printer driver to be installed and for designating one or more clients as installation destinations of the designated printer driver from among the plurality of clients, a determination module for determining whether or not each of the clients designated as the installation destination is in a ready-for-installation state based on the operating state of each of the plurality of clients acquired by the acquisition module, and an installation module for performing processing for installing the designated printer driver via the LAN 100 on the clients that are determined to be in the ready-for-installation state by the determination module.

In exemplary embodiments, at least one of the operating rate of a CPU of the client and the amount of memory usage of the client is acquired as the operating state of the client. Based on such information, it is determined whether or not the client is in the ready-for-installation state in which a printer driver can be installed.

As shown in FIG. 7, a service (or application) 120 operates in each of the clients 102, 103, and 104 on which a printer driver is installed. The service (application) 120 includes two general parts, namely, a search module 121 and printer driver installation modules, such as a decryption module 122, a control module 123, a communication control protocol (Simple Object Access Protocol (SOAP)) 124, an extensible Markup Language (XML) parser 125, an execution module 126, and an executable code module 127. In response to an instruction from an administrator, the server 101 sends a driver installation set including the printer driver to each of the clients 102, 103, and 104 via the LAN 100. SOAP is used as a protocol on the LAN 100. Since SOAP can use a text-based extensible markup language (XML) format, a command (the driver installation set including the printer driver) is encrypted for security. In each of the clients 102, 103, and 104, the encrypted command sent from the server 101 is decrypted by the decryption module 122, and, in accordance with this, the control module 123 controls the execution module 126 to perform installation of the printer driver.

If a printer driver is already installed, after uninstalling the installed printer driver, a new printer driver is installed.

The push installation of a printer driver according to this embodiment is described next with reference to FIG. 5. The process shown in FIG. 5 is performed by the CPU 1 of the server 101 in accordance with the installation control program described above.

Referring to FIG. 5, in step S1001, the CPU 1 searches for printer information on printers connected to the LAN 100 to find printers on the LAN 100 for which printer drivers are to be installed, and acquires the printer information. This search processing is performed using a communication protocol using Simple Network Management Protocol (SNMP) or the like. The printer information acquired here is information about printers for which printer drivers can be installed. The printer information includes, for example, the names and Internet protocol (IP) addresses of the printers.

The results of searching for the printers are displayed on an operating screen of the display 10, and designation by an administrator on this operating screen is input. FIG. 6 shows an example of the operating screen. On the operating screen shown in FIG. 6, a printer list 2000 of the printers for which printer drivers can be installed is displayed on the left of the screen. The printer list 2000 includes the names and IP addresses of the printers acquired in step S1001. Portions in the IP addresses of the printers expressed as "a" in FIG. 6 should actually be expressed in numbers.

In step S1002, the CPU 1 searches for client information on clients connected to the LAN 100 using a communication protocol using Service Location Protocol (SLP), Simple Service Discovery Protocol (SSDP), or the like, and acquires the client information. The client information acquired includes the names and IP addresses of the clients and the operating rates of CPUs of the clients as operating states of the clients. Although the operating rate of a CPU of a client is acquired as an operating state of the client in this embodiment, the amount of memory usage may be acquired instead of the operating rate of the CPU.

In step S1003, the CPU 1 checks the operating rates of the CPUs (or the amounts of memory usage) of the clients in accordance with the information representing the operating states of the clients acquired in step S1002 to determine whether each of the clients is in an idle state or a busy state. A client in which the operating rate of a CPU is lower than a predetermined level (or in which the amount of memory usage is less than a predetermined value) is determined to be in the idle state. A client in which the operating rate of a CPU is higher than or equal to the predetermined level (or in which the amount of memory usage is greater than or equal to the predetermined value) is determined to be in the busy state.

The results of searching for the clients are displayed on the right of the operating screen shown in FIG. 6 as a client list 2001 for the clients connected to the LAN 100. The client list 2001 includes a Control Port field which includes identifications of connection ports (connection port numbers) and a Status field which includes operating states of the clients, in addition to the names and IP addresses of the clients acquired in step S1002. Portions of the IP addresses of the clients expressed as "a" in FIG. 6 should actually be expressed in numbers. The Status of the clients is based on the results of the operating rate check of the clients in step S1003. In exemplary embodiments, for a client that does not respond due to power interruption, none of the information is displayed. Alternatively, "No Response" displayed as the Status. In this example, for a client that does not respond due to power interruption, none of the information is displayed.

In step S1004, the CPU 1 inputs a printer and a client designated by the administrator on the operating screen. For example, the administrator selects an icon representing the name of a printer and superimposes the selected icon on an icon representing the name of a client by a drag-and-drop operation on the operating screen, so that the client on which a printer driver corresponding to the selected printer is to be installed can be selected. Also, if the printer driver is to be installed on a plurality of clients, they can be selected by using a Shift key, a Control (Ctrl) key, or the like. Accordingly, the clients on which the selected printer driver is to be installed are selected. Then, a confirmation message, such as "Is a printer driver corresponding to the selected printer to be installed on all the selected clients?" is displayed on the operating screen, although this is not illustrated here. When an "OK" button is clicked, start of installation of the printer driver corresponding to the selected printer on all of the selected clients is instructed.

Then, in step S1005, the CPU 1 determines whether or not a client in a state other than the idle state, namely, a client in the busy state, is included in the clients selected by step S1004. If it is determined that no client in a state other than the idle state is included in the selected clients, the CPU 1 proceeds to step S1006. On the other hand, if it is determined that a client in a state other than the idle state is included in the selected clients, in step S1010, the CPU 1 sends, via the LAN 100, a message urging the client in a state other than the idle state included in the selected clients to be changed to an idle state. Then, the CPU 1 proceeds to step S1006.

In step S1006, the CPU 1 downloads the selected printer driver on the client in the idle state from among the selected clients via the LAN 100. For a client in which a printer driver is already downloaded, an update may be performed. The update may actually: (1) update the existing installed printer driver; or (2) replace the installed printer driver with a new printer driver. In the first case, the existing driver is not uninstalled and the updates are written to the existing driver. Such updates may include additions to the printer driver and/or rewiring (updating) portions of the existing installed printer driver. In the second case, the existing installed printer driver is uninstalled, and after uninstalling the existing installed printer driver, the downloaded printer driver is installed, as described above. When installation or update of the printer driver is properly performed on the client, an installation or update completion notification is sent from the client to the server 101.

In step S1007, the CPU 1 performs acknowledgement processing for installation completion notifications received from the clients on which installation is performed. In the acknowledgment processing, the installation completion notification sent from the client is received and driver information including the name of the printer driver installed or updated is sent to the client in response to the received installation completion notification.

In step S1008, the CPU 1 displays a list of the results of installation of the printer driver on all of the selected clients in response to reception of the installation completion notifications received by the server 101 in step S1007. Here, information representing whether or not installation for each of the selected clients is properly completed is displayed. For example, if a client in a state other than the idle state is included in the selected clients, a message urging the client to be changed to the idle state is sent to the client in the state other than the idle state, but the printer driver is not installed. Thus, information associated with the fact that the selected printer driver is not installed is displayed for the client in the state other than the idle state. If there is such a client on which the printer driver is not installed due to the state other than the idle state, a "retry" button for designating retry of installation of the printer driver, in addition to the list of the results of installation described above, is displayed.

In step S1009, on the basis of clicking of the "retry" button, the CPU 1 determines whether or not retry is designated. If retry is not designated, the process terminates. In contrast, if retry is designated, processing by the CPU 1 returns to step S1002. Accordingly, it can be determined whether or not a client to which the message urging the client to be changed to the idle state is sent has changed to the idle state. If the client is in the idle state, reselecting the client enables installation of the printer driver.

As described above, an operating state of each of the clients 102, 103 and 104 can be acquired by the server 101 and the printer driver is installed only on clients that are determined to be in the idle state based on the acquired operating state. Thus, interference occurring in the client when the printer driver is installed can be avoided.

Also, if a client in a state other than the idle state is included in the clients selected as installation destinations, a message urging the client to be changed to the idle state is sent to the client in the state other than the idle state. Thus, a client in the busy state selected as an installation destination is urged to be changed to the idle state. Also, the client in the busy state can be changed to the idle state by the time installation of the printer driver on other clients has been completed. As a result of this, for installing the printer driver on the client in the busy state, the client in the busy state can be immediately changed to the idle state, namely, to a ready-for-installation state in which the printer driver can be installed.

Furthermore, according to this embodiment, only inputting an instruction for push installation, which is an instruction for batch installation, from a predetermined terminal by a network administrator automatically performs installation on a plurality of clients without putting loads. Thus, the working efficiency of the network administrator can be significantly increased.

Although a case in which a printer driver is installed is described in this embodiment, the present invention is not limited to this. The principles of the present invention are also applicable to installation of various device drivers, such as drivers for displays, scanners, digital cameras, facsimiles, mice, speakers, sound sources, telephone sets, copying machines, and the like.

A storage medium (or a recording medium) may be supplied on which program code (software) for realizing the functions of the embodiments described above is stored to a system or an apparatus and the program code stored in the storage medium by a computer (or a central processing unit (CPU) or a micro-processing unit (MPU)) may be read and executed by the system or the apparatus. The functions of the embodiments described above can be realized not only by executing the read program code by the computer but also by performing part or all of the actual processing by an operating system (OS) or the like running on the computer on the basis of instructions of the program code.

Furthermore, the functions of the embodiments described above can also be realized by performing part or all of the actual processing by a CPU or the like arranged in a function expansion card of the computer or a function expansion unit connected to the computer on the basis of instructions of program code read from the storage medium after the program code is written in a memory of the function expansion card or the function expansion unit.

As described above, according to the present invention, a device driver can be installed on a client without interfering with the client.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus connectable to a plurality of clients via a network and configured to perform a push installation to install or update, via the network, a device driver on at least one of the clients, the information processing apparatus comprising:

an acquisition unit configured to acquire, via the network, an operating state including a load of central processing unit of each of the clients;

a determination unit configured to determine, for each of the clients, whether the respective client is in a ready-for-installation state based on the operating state of the respective client acquired by the acquisition unit, where it is determined that the respective client is in the ready-for-installation state if the load of the central processing unit in the operating state of the client acquired by the acquisition unit is lower than a predetermined load amount and it is determined that the respective client is not in the ready-for-installation state if the load of the central processing unit in the operating state of the client acquired by the acquisition unit is equal to or higher than the predetermined load amount;

a selection unit configured to select the clients that are determined by the determination unit to be in the ready-for-installation state;

an installation unit configured to perform processing for installing or updating a device driver on the clients selected by the selection unit;

a sending unit configured to send an instruction to the clients that are determined by the determination unit not to be in the ready-for-installation state so that the clients can become in the ready-for-installation state;

a displaying unit configured to display a first indication including a client which has sent a notification for completion of installation and status information corresponding to the client indicating the completion of installation in the client, and a second indication including a client which received the instruction from the sending unit and has not sent the notification for the completion of installation and status information corresponding to the client indicating the incompletion of installation in the client;

a retry instruction portion on a graphical user interface to install the device driver to the clients in which the device drivers are not installed; and a repeating unit configured to repeat, in response to input to the retry instruction portion on the graphical user interface, the determination process by the determination unit, the selecting process by the selection unit and the process for installing or updating as device driver selected on the clients by the selection unit, wherein processing by the installation unit and the sending unit are executed in parallel.

2. The information processing apparatus according to claim 1, further comprising a designation unit configured to designate the device driver to be installed or updated and to designate, from among the plurality of clients, at least one of the clients as an installation destination of the designated device driver, wherein:

the determination unit is configured to determine, for each of the designated clients, whether the respective designated client is in the ready-for-installation state based on the operating state of the respective designated client acquired by the acquisition unit; and the installation unit is configured to perform processing for installing or updating, via the network, the designated device driver on each of the designated clients determined to be in the ready-for-installation state.

3. The information processing apparatus according to claim 1, further comprising a notification unit configured to transmit, via the network, a message urging a respective client determined not to be in the ready-for-installation state to be changed to the ready-for-installation state.

4. The information processing apparatus according to claim 1, wherein the load of the central processing unit in the operating state of each of the clients includes an operating rate of a central processing unit of the respective client.

5. The information processing apparatus according to claim 4, wherein the determination unit is configured to determine that a respective client having an operating rate of the central processing unit less than a predetermined operating rate of the central processing unit is in the ready-for-installation state.

6. The information processing apparatus according to claim 1, wherein the load of the central processing unit in the operating state of each of the clients includes an amount of memory usage of the respective client.

7. The information processing apparatus according to claim 6, wherein the determination unit is configured to determine that the respective client having an amount of memory usage less than a predetermined amount of memory usage is in the ready-for-installation state.

8. The information processing apparatus according to claim 1, further comprising a driver information notification unit configured to receive an installation completion notification from each of the respective clients on which the device driver is installed, and sending, via the network, information about the installed device driver to the respective clients in response to reception of the installation completion notification.

9. The information processing apparatus according to claim 1, further comprising a driver information notification unit configured to receive an update completion notification from each of the respective clients on which the device driver is updated, and sending, via the network, information about the updated device driver to the respective clients in response to reception of the update completion notification.

10. The information processing apparatus according to claim 1, wherein the installation unit is configured to determine if a version of the device driver is already installed on a respective client, and to update the device driver to be updated by performing processing for uninstalling the version of the device driver already installed on the respective client before performing processing for updating the device driver by installing, via the network, the device driver on the respective client.

11. The information processing apparatus according to claim 1, wherein the device driver is a printer driver.

12. A push installation method for a server to install or update, via a network, a device driver on one or more clients, the push installation method comprising:

(i) acquiring, via the network, an operating state including a load of central processing unit of each of the clients;

(ii) determining whether each of the clients is in a ready-for-installation state based on the operating state of each of the clients, where it is determined that the respective client is in the ready-for-installation state if the load of the central processing unit in the operating state of the client acquired is lower than a predetermined load amount and it is determined that the respective client is not in the ready-for-installation state if the load of the central processing unit in the operating state of the client acquired is equal to or higher than the predetermined load amount;

(iii) selecting the clients that are determined to be in the ready-for-installation state;

(iv) performing processing for installing or updating the device driver;

(v) sending an instruction to the clients that are determined to not be in the ready-for-installation state so that the clients can become in the ready-for-installation state;

(vi) displaying a first indication including a client which has sent a notification for completion of installation and status information corresponding to the client indicating the completion of installation in the client, and a second indication including a client which received the instruction from a sending unit and has not sent the notification for the completion of installation and status information corresponding to the client indicating the incompletion of installation in the client;

(vii) displaying a retry instruction portion on a graphical user interface to install the device driver to the clients in which the device drivers are not installed; and (iii) repeating (i)-(vii) in response to input to the retry instruction portion on the graphical user interface, wherein (iv) and (v) are performed in parallel.

13. The push installation method according to claim 12, further comprising:

designating the device driver; and designating at least one designated client from among the clients as an installation destination of the designated device driver, wherein:

determining whether each of the clients is in a ready-for-installation state comprises determining whether each of the designated clients is in the ready-for-installation state based on the operating state of each of the designated clients; and performing processing for installing the device driver comprises performing processing for installing or updating the designated device driver, via the network, on the designated clients that are determined to be in the ready-for-installation state.

14. The push installation method according to claim 12, further comprising sending to at least one client determined not to be in the ready-for-installation state, via the network, a notification message urging the at least one client to be changed to the ready-for-installation state.

15. The push installation method according to claim 12, wherein, the load of the central processing unit in the operating state acquired from each of the clients includes an operating rate of a central processing unit of the respective client.

16. The push installation method according to claim 15, wherein, a respective client having an operating rate of the central processing unit that is less than a predetermined operating rate is determined to be in the ready-for-installation state.

17. The push installation method according to claim 12, wherein, the load of the central processing unit in the operating state acquired from each of the clients includes an amount of memory usage of the respective client.

18. The push installation method according to claim 17, wherein, the respective client having an amount of memory usage that is less than a predetermined amount of memory usage is determined to be in the ready-for-installation state.

19. The push installation method according to claim 12, further comprising:
    receiving, via the network, an installation completion notification from at least one client on which the device driver is installed; and
    sending, via the network, information about the installed device driver to the at least one client in response to reception of the installation completion notification.

20. The push installation method according to claim 12, further comprising:
    receiving, via the network, an update completion notification from at least one client on which the device driver is updated; and
    sending, via the network, information about the updated device driver to the at least one client in response to reception of the update completion notification.

21. The push installation method according to claim 12, further comprising:
    determining, via the network, if the device driver needs to be uninstalled on a respective one of the clients in the ready-for-installation state because a version of the device driver is already installed on the respective client; and
    if it is determined that the device driver needs to be uninstalled on the respective client, performing processing for uninstalling the version of the device driver already installed on the respective client before performing processing for installing the device driver, via the network, on the respective client.

22. The push installation method according to claim 12, wherein the device driver is a printer driver.

23. A computer-readable recording medium having stored thereon computer-executable instructions executable by an information processing apparatus connectable to a plurality of clients via a network, the computer-executable instructions comprising:
    an acquisition module for acquiring an operating state including a load of central processing unit of each of the plurality of clients via the network;
    a determination module for determining whether each of the plurality of clients is in a ready-for-installation state based on the operating state of each of the clients, where it is determined that the respective client is in the ready-for-installation state if the load of the central processing unit in the operating state of the client acquired is lower than a predetermined load amount and it is determined that the respective client is not in the ready-for-installation state if the load of the central processing unit in the operating state of the client acquired is equal to or higher than the predetermined load amount;
    a selection module for selecting the clients that are determined by the determination module to be in the ready-for-installation state;
    an installation module for performing processing for installing or updating a device driver, on the clients that are selected by the selection module;
    a sending module for sending an instruction to the clients determined by the determination module not to be in a ready-for-installation state so that the clients can become in the ready-for-installation state;
    a displaying module for displaying a first indication including a client which has sent a notification for completion of installation and status information corresponding to the client indicating the completion of installation in the client, and a second indication including a client which received the instruction from the sending module and has not sent the notification for the completion of installation and status information corresponding to the client indicating the incompletion of installation in the client;
    a retry instruction portion on a graphical user interface to install the device driver to the clients in which the device drivers are not installed; and
    a repeating module for causing processing performed by the acquisition module, the determination module, the selection module and the installation module to be repeated in response to the retry instruction portion on the graphical user interface,
    wherein processing performed by the sending module and the installation module is performed in parallel.

24. An information processing apparatus connectable to a plurality of clients via a network and configured to perform a push installation of a device driver to at least one of the clients via the network, the information processing apparatus comprising:
    acquisition means for acquiring, via the network, an operating state including a load of central processing unit of each of the clients;
    determination means for determining, for each of the clients, whether the respective client is in a ready-for-installation state based on the operating state of the respective client acquired by the acquisition means, where it is determined that the respective client is in the ready-for-installation state if the load of the central processing means in the operating state of the client acquired by the acquisition means is lower than a predetermined load amount and it is determined that the respective client is not in the ready-for-installation state if the load of the central processing unit in the operating state of the client acquired by the acquisition means is equal to or higher than the predetermined load amount;
    selection means for selecting the clients that are determined by the determination means to be in the ready-for-installation state;
    installation means for performing processing for installing or updating a device driver on the clients selected by the selection means;
    sending means for sending an instruction to the clients determined by the determination means to not be in the ready-for-installation state so that the clients can become in the ready-for-installation state;
    displaying means for displaying a first indication including a client which has sent a notification for completion of installation and status information corresponding to the client indicating the completion of installation in the client, and a second indication including a client which received the instruction from the sending means and has not sent the notification for the completion of installation and status information corresponding to the client indicating the incompletion of installation in the client;

a retry instruction portion on a graphical user interface to install the device driver to the clients in which the device drivers are not installed; and repeating means for causing processing performed by the acquisition means, the determination means, the selection means and the installation means to be repeated in response to input to the retry instruction portion displayed by the displaying means, wherein processing performed by the installation means and the sending means is performed in parallel.

* * * * *